_(12)_ United States Patent
Fan

(10) Patent No.: US 7,647,414 B2
(45) Date of Patent: Jan. 12, 2010

(54) SYSTEM AND METHOD FOR MANAGING MULTIPLE STACK ENVIRONMENTS

(75) Inventor: Kan Frankie Fan, Diamond Bar, CA (US)

(73) Assignee: Broadcom Corporation, Irvine, CA (US)

( * ) Notice: Subject to any disclaimer, the term of this patent is extended or adjusted under 35 U.S.C. 154(b) by 1284 days.

(21) Appl. No.: 10/336,983

(22) Filed: Jan. 6, 2003

(65) Prior Publication Data

US 2004/0019689 A1   Jan. 29, 2004

Related U.S. Application Data

(60) Provisional application No. 60/398,663, filed on Jul. 26, 2002, provisional application No. 60/434,503, filed on Dec. 18, 2002.

(51) Int. Cl.
*G06F 15/16* (2006.01)
*G06F 15/173* (2006.01)

(52) U.S. Cl. .................. 709/230; 709/223; 709/229

(58) Field of Classification Search ............. 709/223, 709/227–230
See application file for complete search history.

(56) References Cited

U.S. PATENT DOCUMENTS

| | | | | |
|---|---|---|---|---|
| 5,640,394 | A * | 6/1997 | Schrier et al. ............... | 370/389 |
| 5,734,865 | A | 3/1998 | Yu | |
| 5,944,783 | A * | 8/1999 | Nieten ........................ | 709/202 |
| 6,182,146 | B1 * | 1/2001 | Graham-Cumming, Jr. . | 709/238 |
| 6,182,149 | B1 * | 1/2001 | Nessett et al. ............... | 709/247 |
| 6,272,151 | B1 | 8/2001 | Gupta et al. | |
| 6,324,583 | B1 * | 11/2001 | Stevens ...................... | 709/230 |
| 6,449,695 | B1 * | 9/2002 | Bereznyi et al. ............. | 711/134 |
| 6,687,758 | B2 * | 2/2004 | Craft et al. .................. | 709/250 |
| 6,789,116 | B1 * | 9/2004 | Sarkissian et al. ........... | 709/224 |
| 6,859,835 | B1 * | 2/2005 | Hipp ........................... | 709/227 |
| 6,941,369 | B1 * | 9/2005 | Krack et al. ................. | 709/225 |
| 6,968,386 | B1 * | 11/2005 | Benayoun et al. ........... | 709/231 |
| 6,993,031 | B2 * | 1/2006 | Murase ................... | 370/395.32 |
| 7,089,326 | B2 * | 8/2006 | Boucher et al. ............. | 709/242 |
| 2001/0047421 | A1 * | 11/2001 | Sridhar et al. ............... | 709/230 |
| 2002/0147856 | A1 * | 10/2002 | Sarkar et al. ................ | 709/313 |

(Continued)

FOREIGN PATENT DOCUMENTS

EP   1 168 754 A1   1/2002

(Continued)

OTHER PUBLICATIONS

"Winsock Direct and Protocol Offload on SANs", Microsoft Corporation, Version 1.0, 8 Pages (Mar. 3, 2001).

*Primary Examiner*—Nathan Flynn
*Assistant Examiner*—Joshua Joo
(74) *Attorney, Agent, or Firm*—McAndrews, Held & Malloy, Ltd.

(57) ABSTRACT

Systems and methods that manage multiple stack environments are provided. In one example, a system may include, for example, a first protocol processing stack, a second protocol processing stack and a mapper. The mapper may be coupled to the first protocol processing stack and to the second protocol processing stack. A first port number may be associated with the first protocol processing stack and a second port number may be associated with the second protocol processing stack. The mapper may store a correspondence between the first port number and the second port number.

34 Claims, 4 Drawing Sheets

U.S. PATENT DOCUMENTS

2002/0178268 A1* 11/2002 Aiken et al. ............... 709/228
2003/0204620 A1* 10/2003 Cheng ....................... 709/238
2004/0010624 A1* 1/2004 Garofalo et al. ............ 709/250
2004/0030745 A1* 2/2004 Boucher et al. ............ 709/203
2005/0094581 A1* 5/2005 Giloi et al. ................. 370/260

FOREIGN PATENT DOCUMENTS

WO     WO 02 23862 A     3/2002

* cited by examiner

SYSTEM AND METHOD FOR MANAGING MULTIPLE STACK ENVIRONMENTS

RELATED APPLICATIONS

This application makes reference to, claims priority to and claims benefit from U.S. Provisional Patent Application Ser. No. 60/398,663, entitled "Dual TCP/IP Stacks Connection Management for Winsock Direct (WSD)" and filed on Jul. 26, 2002; and U.S. Provisional Patent Application Ser. No. 60/434,503, entitled "System and Method for Managing Multiple Stack Environments" and filed on Dec. 18, 2002.

INCORPORATION BY REFERENCE

The above-identified United States patent applications are hereby incorporated herein by reference in their entirety.

BACKGROUND OF THE INVENTION

The Winsock Direct model is a communication model that provides a system area network (SAN) to applications. Dual TCP stacks run on the same system using the same IP address. Some of the TCP connections are processed by a Microsoft stack. Some established TCP connections can be offloaded to a hardware stack. The Winsock Direct model has not been applied on a true TCP/IP connection (e.g., the Ethernet), instead it has been applied only to a proprietary interconnect.

When a packet arrives as part of an established connection, a mechanism is needed by which the packet can be routed to either the Microsoft stack or the hardware stack. If the packet is delivered to the wrong stack, then the connection will terminate in the ensuing confusion. The problem becomes even more acute if a packet arrives before a TCP connection has been established.

Further limitations and disadvantages of conventional and traditional approaches will become apparent to one of ordinary skill in the art through comparison of such systems with the present invention as set forth in the remainder of the present application with reference to the drawings.

BRIEF SUMMARY OF THE INVENTION

Aspects of the present invention may be found in, for example, systems and methods that manage multiple stack environments. In one embodiment, the present invention may provide a system that manages a multiple stack environment. The system may include, for example, a first protocol processing stack, a second protocol processing stack and a mapper. The mapper may be coupled to the first protocol processing stack and to the second protocol processing stack. A first port number may be associated with the first protocol processing stack and a second port number may be associated with the second protocol processing stack. The mapper may store, for example, a correspondence between the first port number and the second port number.

In another embodiment, the present invention may provide a system that manages a multiple stack environment. The system may include, for example, a first processing stack, a second processing stack and a network adapter. The network adapter may be coupled to the first processing stack and the second processing stack and may be adapted to determine which of the first processing stack and the second processing stack to send an incoming packet based upon at least port information carried by the incoming packet.

In yet another embodiment, the present invention may provide a communication system. The communication system may include, for example, a first computer and a second computer. The first computer may include, for example, a first processing stack and a second processing stack. The first computer may assign a first port number to the first processing stack and a second port number to the second processing stack and may store a correspondence between the first port number and the second port number. The second computer may be coupled to the first computer via a network. The second computer may request information about the second port number via at least one of the first port number and the stored correspondence between the first port number and the second port number.

In yet another embodiment, the present invention may provide a method that manages a multiple stack environment. The method may include, for example, one or more of the following: listening on a first port number by an application running on a computer; associating the first port number to a first processing stack of the computer; associating a second port number to the second processing stack of the computer; and sending a packet received by the computer to the application via the second processing stack, the received packet comprising the second port number. The multiple stack environment may include more than two processing stacks on the computer. For example, the method may further include one or more of the following: associating a third port number to a third processing stack of the computer; and sending a packet received by the computer to the application via the third processing stack in which the received packet may include, for example, the third port number.

In still yet another embodiment, the present invention may provide a method that provides communication between a first computer and a second computer. The method may include, for example, one or more of the following: associating a first port number with a default processing stack of the first computer; associating a second port number with a second processing stack of the first computer; storing a correspondence between the first port number and the second port number in the first computer; sending a datagram from the second computer to the first computer inquiring as to a port number corresponding to the first port number; sending a return datagram from the first computer to the second computer comprising the second port number; and communicating over the second processing stack of the first computer using the second port number.

One or more embodiments of the present invention may include one or more of the advantages as set forth below. For example, the port mapper may be distributed to some or all of the computers participating in a communication. Furthermore, if advantageous, the need to have a centralized or multiple replicated repositories (e.g., Domain Name Services (DNS)) may be reduced. Centralized or multiple replicated repositories may sometimes incur substantial deployment and management costs and may sometimes be susceptible to a single point of failure.

These and other features and advantages of the present invention may be appreciated from a review of the following detailed description of the present invention, along with the accompanying figures in which like reference numerals refer to like parts throughout.

DETAILED DESCRIPTION OF THE INVENTION

Some embodiments of the present invention relate to systems and methods for managing multiple stack environments. For example, where a particular machine exposes a plurality of services (e.g., an expedited service, a traditional service, etc.), some embodiments of the present invention may provide an expedient manner in which another machine may connect to the better services. Although one or more embodiments may be described below with respect to a particular type of application such as, for example, iWARP or RDMA over TCP, the present invention need not be so limited. Some embodiments of the present invention may be implemented with minimal implication to the overall networking ecosystem.

Figure 1:
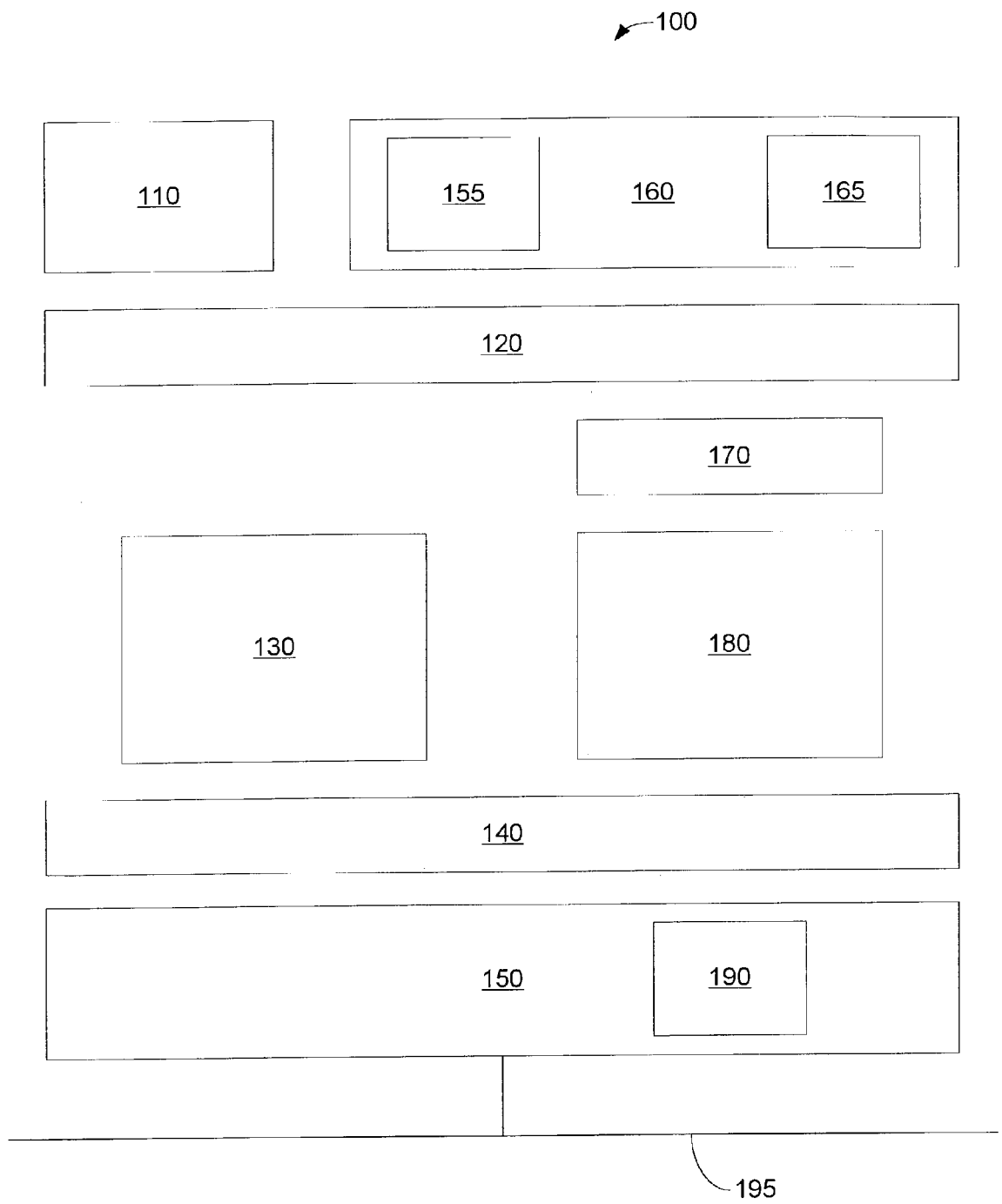
FIG. 1 shows a diagram illustrating an embodiment of a server according to the present invention

FIG. 1 shows a diagram illustrating an embodiment of a server according to the present invention. The server 100 may include, for example, a plurality of architectural layers. In one embodiment, the server 100 may include, for example, an application 110, a switch 120, a host stack 130, a network interface card (NIC) driver 140, a network adapter 150, a port mapper 160, a dynamic link library (DLL) 170 and an offload stack 180. The application 110 may be, for example, one or more Winsock-compliant applications. The switch 120 may be, for example, a Winsock switch. The host stack 130 may be, for example, a host TCP/IP stack (e.g., a Microsoft TCP/IP stack). The network adapter 150 may include, for example, a look-up table (LUT) 190 such as, for example, a partial tuple loop-up table or some other type of data structure. The port mapper 160 may include, for example, a local port mapping database 155 and a remote port mapping cache 165. The port mapper 160 may be, for example, an iWARP port mapper. The DLL 170 may be, for example, a system area network (SAN) provider DLL. The offload stack 180 may be, for example, a SAN provider stack or an RDMA TCP/IP stack. The host stack 130 and the offload stack 180 may share the same IP address. In one embodiment, the host stack 130 may not be aware of the offload stack 180 or may not allow TCP connection migration between the two stacks 130, 180. Furthermore, although illustrated as a dual stack environment, the present invention also contemplates using more or less than two stacks.

The port mapper 160 may be, for example, a distributed software component and may be adapted, for example, to perform one or more of the following functions: registering a port, de-registering a port, answering port queries and querying a remote port mapper. Registering a port or de-registering a port may include, for example, one or more of the following tasks: requesting the next available TCP port from the host stack (e.g., using a Winsock bind operation with port 0 to request the next available TCP port from a Microsoft stack); keeping track of the correspondence between a host stack port number (e.g., a TCP port number) and an offload stack port number (e.g., an iWARP port number) in a port mapping database; keeping a usage count of each offload stack port; and returning an offload stack port to the host stack 130 when the usage count reaches a particular number (e.g., zero). In one embodiment, the port mapper 160 may be adapted to register or to de-register an iWARP port. Answering port queries may include, for example, one or more of the following tasks: listening on a well-known UDP port; looking up information in the port mapping database via, for example, a TCP port; and replying back to a requestor with iWARP port information. In one embodiment, an iWARP port query may be answered via, for example, a well-known UDP port. Querying a remote port mapper may include, for example, one or more of the following tasks: managing a remote port mapping cache of the local port mapper for active open; looking up information in the remote port mapping cache of the local port mapper or the remote port mapper via, for example, a remote IP address and a remote TCP port; sending a request to the remote port mapper if no information is found in the remote port mapping cache of the local port mapper; keeping track of entries in remote port mapping cache of the local port mapper using a reference count; periodically renewing or updating the remote port mapping cache entries of the local port mapper by sending a request to the remote port mapper; and invalidating the remote port mapping cache entries when the corresponding reference counts reach, for example, zero (e.g., when no connections are using the particular entries in the local remote port mapping cache) or when particular remote port mapping cache entries have not been used for a threshold period of time.

According to one embodiment, a TCP port number and an iWARP port number may be described as set forth below. The TCP port number may be requested by the application 110 and may be used for connections through the host stack 130 (e.g., a Microsoft stack). In addition, the host stack 130 may be listening on the TCP port number. The iWARP port number may be a TCP port that is run-time allocated and is dedicated for an iWARP connection. The iWARP port number may be used for connections through the offload stack 180 (e.g., a SAN provider stack). In addition, in one embodiment, at most one iWARP port number may correspond to each TCP port number.

The DLL 170 may be adapted, for example, to perform one or more of the following functions: binding, connecting, listening, accepting and closing. The DLL 170 may include a bind handler (e.g., a WSPBind handler) that may be adapted to save the TCP port number in a per socket private structure and to defer the actual bind operation. In connecting (e.g., via WSPConnect) by an active socket, the DLL 170 may be adapted, for example, to perform one or more of the following tasks: invoking the port mapper 160 to query a remote port mapper for the offload stack port number (e.g., iwarp_port_map(dst_ip_addr, tcp_port)); invoking the offload stack 180 (e.g., a SAN provider stack) to bind to the offload stack port number (e.g., iWARP port number); initiating a TCP connect to the offload stack port number on the offload stack 180 (e.g., initiating a TCP connect to an iWARP port number on the SAN provider stack); and going directly into an offload mode (e.g., a TCP connection going directly into an RDMA mode (i.e., the iWARP port is a priori)).

In listening (e.g., via WSPListen) by a passive socket, the DLL 170 may be adapted, for example, to perform one or more of the following tasks: registering a TCP port with the port mapper 160 (e.g., an iWARP port mapper); receiving an offload stack port number from the port mapper 160, which previously had communicated with the host stack 130 to get the next available port; invoking the offload stack 180 to bind to the offload stack port number (e.g., the iWARP port number); and initiating TCP listen on the offload stack 180 (e.g., a SAN provider stack) and following a typical connection setup (e.g., the standard passive TCP connection setup).

In accepting an incoming connection (e.g., accepting an incoming iWARP connection via WSPConnect), the DLL 170 may be adapted, for example, to perform one or more of the following tasks: invoking the port mapper 160 to reference a port; and increasing the reference count via the port mapper 160.

In terminating a connection (e.g., terminating a connection via WSPCloseSocket), the DLL 170 may be adapted, for example, to perform one or more of the following tasks, including: invoking the port mapper 160 to de-reference the offload stack port; and freeing an offload stack port via the port mapper 160 if the reference count is, for example, zero.

Figure 2:
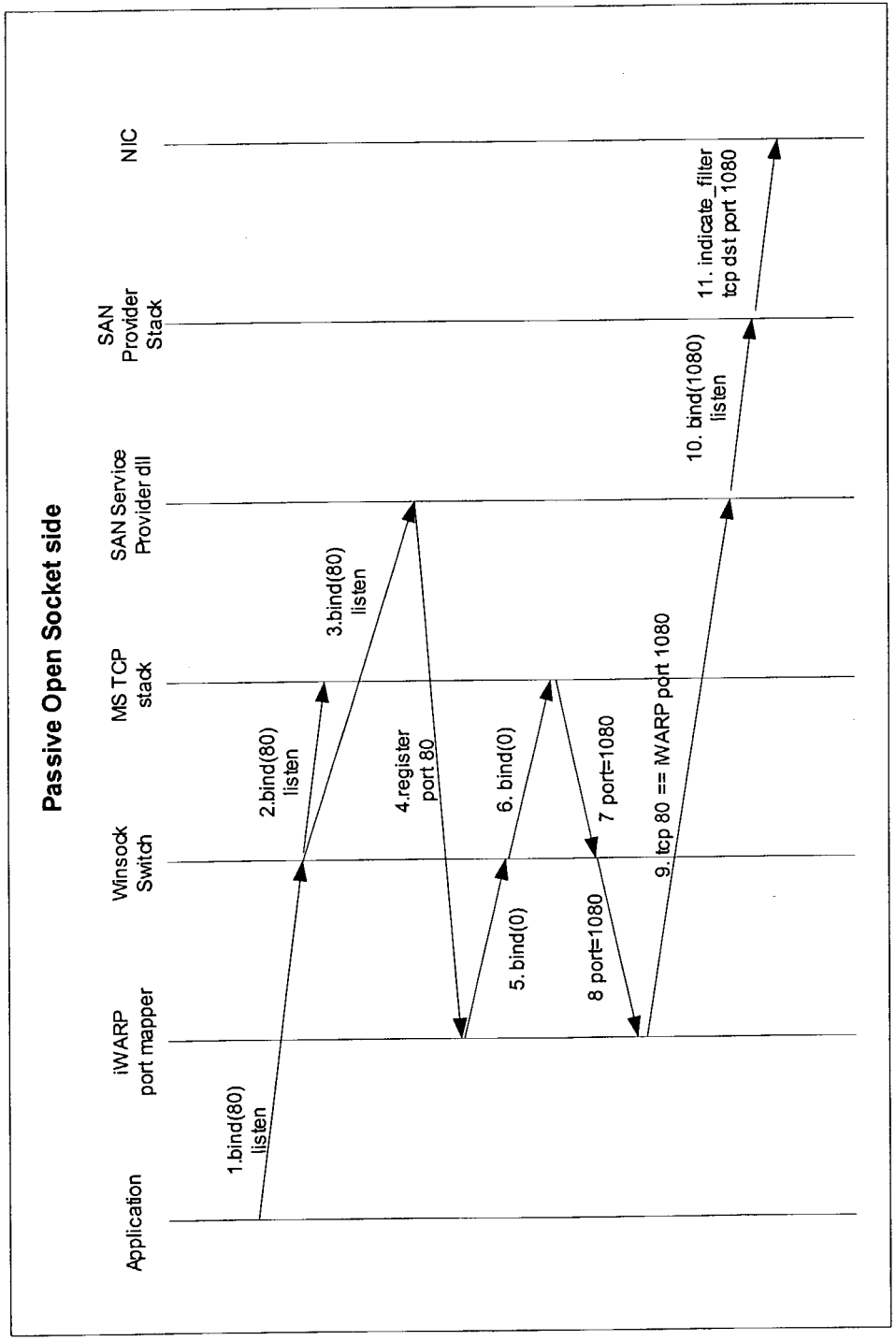
FIG. 2 shows a timing diagram illustrating an embodiment of a process for operating a server according to the present invention

FIG. 2 shows a timing diagram illustrating an embodiment of a process for operating a server according to the present invention. In one embodiment, the server 100 may include or may be a part of the passive open socket side. Referring to FIGS. 1 and 2, in operation, the application 110 may contact the switch 120, thereby notifying the switch 120 that the application 110 intends to listen on a particular port, for example, port 80. The application 110 need not be aware that the server 100 has multiple stacks (e.g., two or more TCP/IP processing stacks). The switch 120 may pass the listen request to the host stack 130. The network adapter 150 may receive packets from a physical medium 195 (e.g., a cable, a wire, fiber, air, etc.) In one embodiment, if the network adapter 150 determines that a received packet is associated with the server's destination IP address and a port number, which is not stored in the LUT 190 of the network adapter 150, then, as a default operation, the received packet may be sent to the host stack 130 for processing.

At approximately the same time as the switch may be passing the listen request to the host stack 130, the switch may also be passing the listen request to the DLL 170. The DLL 170 then may communicate with the port mapper 160 and may register port 80 with the port mapper 160. The port mapper 160 may then communicate with the host stack 130 via, for example, the switch 120 to determine what other ports may be available (e.g., the next available port number). The host stack 130 may determine which port is available and report the available port number, for example, port 1080 to the port mapper 160. The port mapper 160 may associate or may link the available port (e.g., port 1080) with the originally requested port (e.g., port 80). The port mapper 160 may then notify the DLL 170 to listen, instead, on port 1080 (e.g., iWARP port 1080). The listen request may be passed on the offload stack 180 which, in turn, may pass on the listen request to the network adapter 150 via the NIC driver 140. The network adapter 150 may store the information (e.g., destination IP address, port number, etc.) in the LUT 190 such that received packets associated with the information stored in the LUT 190 may be sent to the offload stack 180 for processing. For example, if a packet received by the network adapter 150 is associated with port 1080 and the server's destination IP address, then the network adapter 150 may send the received packet to the offload stack 180 to be processed. If the packet received by the network adapter 150 is associated with the server's destination IP address, but not with port 1080 or any other port number stored in the LUT 190 and associated with the offload stack 180, then the received packet may not be processed by the offload stack 180. Under such conditions, the network adapter 150 may send the received packet, for example, to the host stack 130 as a default operation. Thus, the host stack 130 may receive packets associated with port 80 or other ports not linked with the offload stack 180 as set forth in the LUT 190; and the offload stack 180 may receive packets associated with port 1080 or other ports that are linked with the offload stack 180.

Figure 3:
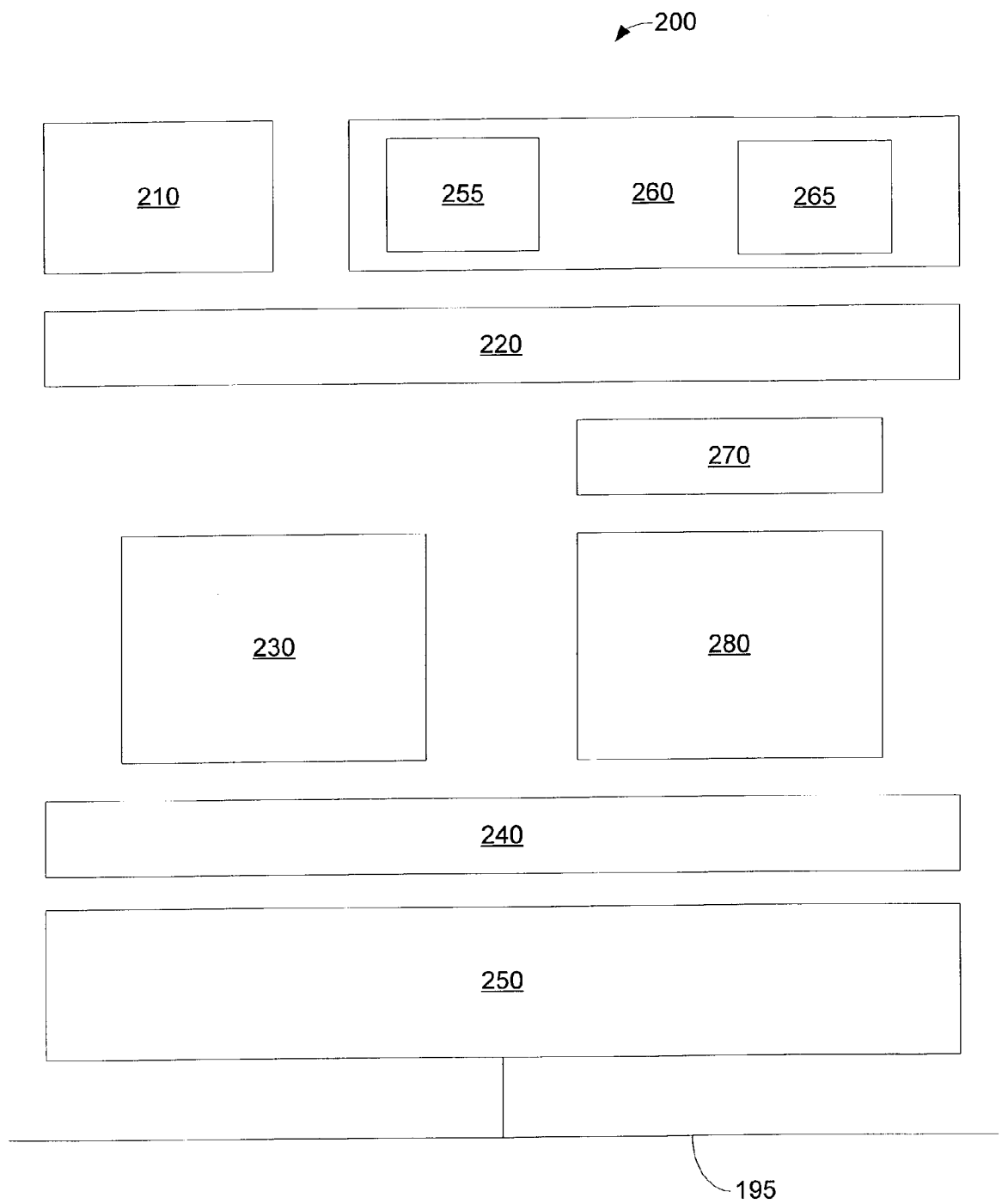
FIG. 3 shows a diagram illustrating an embodiment of a client according to the present invention.

FIG. 3 shows a diagram illustrating an embodiment of a client according to the present invention. The client 200 may include, for example, a plurality of architectural layers. In one embodiment, the client 200 may include, for example, an application 210, a switch 220, a host stack 230, a NIC driver 240, a network adapter 250, a port mapper 260, a DLL 270 and an offload stack 280. The port mapper 260 may include, for example, a local port mapping database 255 and a remote port mapping cache 265. The descriptions as set forth above with respect to similar components of the server 100 may also be applicable, at least in part, to respective components of the client 200. For example, the port mapper 260 may be adapted as described with respect to the port mapper 160; or the DLL 270 may be adapted as described with respect to the DLL 170. Similarly, the application 210 may be, for example, one or more Winsock-compliant applications. The switch 220 may be, for example, a Winsock switch. The host stack 230 may be, for example, a host TCP/IP stack (e.g., a Microsoft TCP/IP stack). The port mapper 260 may be, for example, an iWARP port mapper. The DLL 270 may be, for example, a SAN provider DLL. The offload stack 280 may be, for example, a SAN provider stack or an RDMA TCP/IP stack. The host stack 230 and the offload stack 280 may share the same IP address. In one embodiment, the host stack 230 may not be aware of the offload stack 280 or may not allow TCP connection migration between the two stacks 230, 280. Furthermore, although illustrated as a dual stack environment, the present invention also contemplates using more or less than two stacks. One possible difference between the components of the server 100 and the components of the client 200 may be that the network adapter 250 of the client 200 may not include a LUT (e.g., a partial tuple look-up table) as described above with respect to the network adapter 150 of the server 100. It is possible that a particular computing device may have its components adapted for purely client-side functionality. Nevertheless, because a computing device may be both a client and a server at one time or another or even concurrently, the similar components may be identical or almost identical. Thus, for example, a computing device adapted to serve as a client and/or a server may include a LUT in its network adapter. In another example, a computing device adapted to serve only as a client may still include a LUT in its network adapter.

Figure 4:
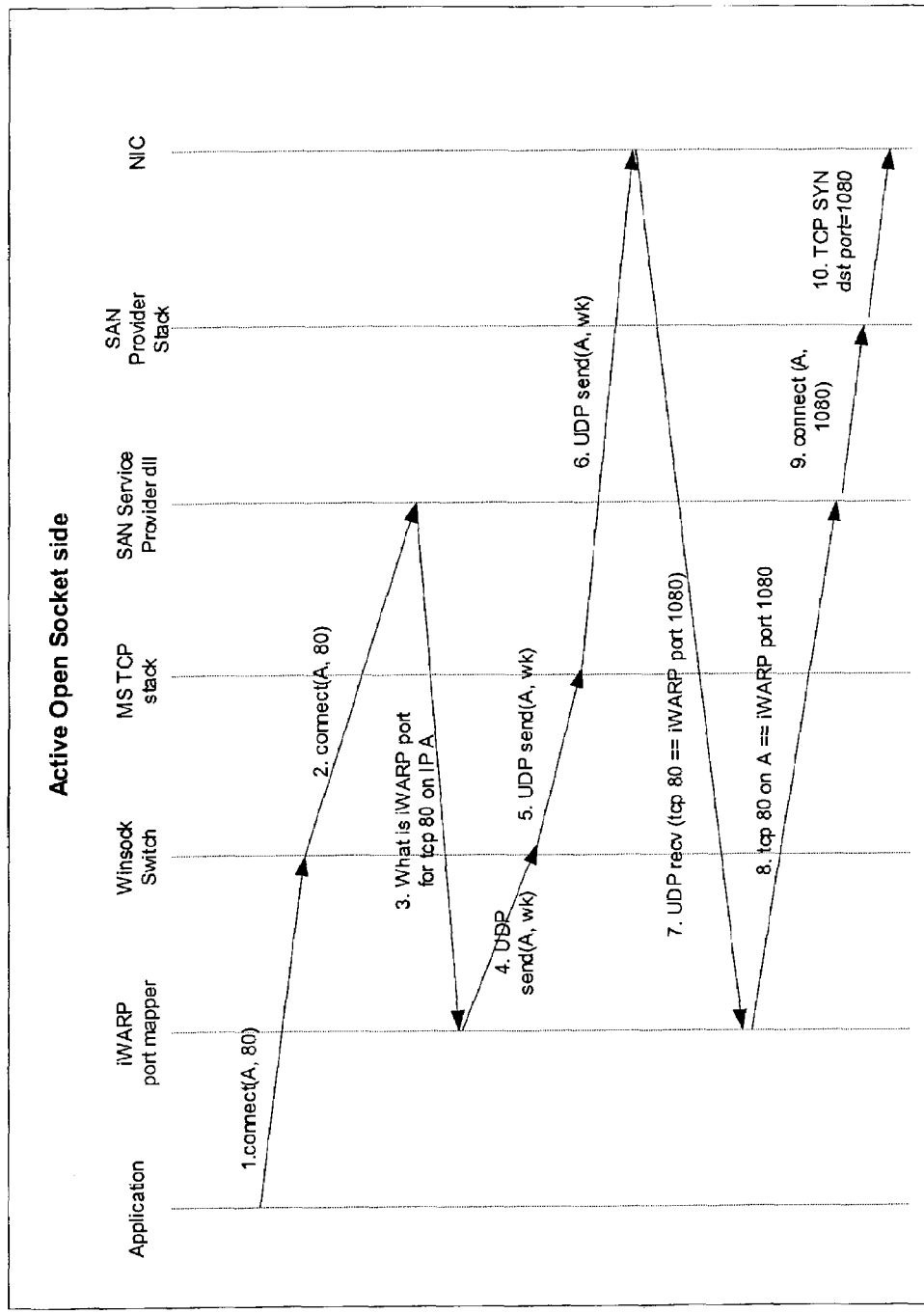
FIG. 4 shows a timing diagram illustrating an embodiment of a process for operating a client according to the present invention.

FIG. 4 shows a timing diagram illustrating an embodiment of a process for operating a client according to the present invention. In one embodiment, the client 200 may include or may be a part of the active open socket side. Referring to FIGS. 3 and 4, in operation, the application 210 may contact the switch 220, thereby notifying the switch 220 that the application 210 of the client 200 may intend to connect with application 110 of the server 100. For example, the application 210 may communicate with the switch 220 that the application 210 may intend to connect with a destination identified by the server's IP address and a particular port, for example, port 80 of the server 100. The connection request and the connection parameters may then be forwarded to the DLL 270. The DLL 270 may then query the port mapper 260 as to the server's offload stack port number (e.g., the server's iWARP port number) for, in this example, the server's port 80.

In response, if the port mapper 260 does not know the server's offload stack port number corresponding to the server's port 80, then the port mapper 260 may look up the locally managed remote port mapping cache, or may generate a user datagram protocol (UDP) datagram (e.g., a UDP send datagram) carrying the query. The UDP datagram may be sent from the port mapper 260 to the switch 220, through the host stack 230, the NIC driver 240 and the network adapter 250 to the physical medium 195. The physical medium 195 may be part of a network such as, for example, an Ethernet or the internet. The UDP datagram may be carried on the physical medium 195 from the client 200 to the server 100. The UDP datagram may then be received by the network adapter 150 of the server 100. The network adapter 150 may send the UDP datagram to be processed by the host stack 130. The host stack 130 may process the UDP datagram and send the UDP datagram or a portion thereof (e.g., the query) to the port mapper 160. The port mapper 160 may be adapted to listen to a well-known UDP port to resolve mapping issues. The port mapper 160 may look through its database to answer the query. By looking up the queried host stack port number (e.g., the TCP port number) in the database of the port mapper 160, the port mapper 160 may determine the offload stack port number (e.g., the iWARP port number) that is associated with or linked to the host stack port number. In one example, the port mapper 160 may report that TCP port 80 of the server 100 corresponds to iWARP port 1080 of the server 100. The information may be reported in the form of a return UDP datagram (e.g., a UDP receive datagram) sent to the physical medium 195 from the port mapper 160 via the switch 120, the host stack 130, the NIC driver 140 and the network adapter 150. The information from the port mapper 160 may be carried by the physical medium 195 from the server 100 to the client 200. The return UDP datagram may be received by the network adapter 250 of the client 200 and sent to the host stack 230 for processing. The host stack 230 may forward the return UDP datagram or a portion thereof (e.g., a payload including the requested information) to the port mapper 260 via, for example, the switch 220. The port mapper 260 may then store the requested information (e.g., that server TCP port 80 corresponds to server iWARP port 1080) in its database, which may be in the form of, for example, a table (e.g., a LUT).

The port mapper 260 may report back to the DLL 270 as to the corresponding offload stack port number. In one example, the port mapper 260 may inform the DLL 270 that the server's TCP port 80 corresponds to the server's iWARP port 1080. The DLL 270 may then send the connection request to the offload stack 280 with the parameters including the server's IP address and the server's offload stack port number (e.g., iWARP port 1080). The connection request may then be sent out over the physical medium 195 via the NIC driver 240 and the network adapter 250. The physical medium 195 may carry the connection request (e.g., TCP SYN with dest_port=1080) from the client 200 to the server 100.

The connection request may be received by the network adapter 150 of the server 100. The network adapter 150 may ascertain some of the destination parameters from the received packet. In one example, the destination parameters may include the server's IP address and the port number on which the offload stack 180 is listening. The destination parameters may be compared to values stored in the LUT 190. The LUT 190 may indicate, for example, that there is a correspondence between a particular port number and a particular processing stack. In one example, the LUT 190 may indicate that a packet including the server's IP address and iWARP port 80 should be sent to the offload stack 180 for processing. The packet may receive the accelerating processing of the offload stack 180 before being forwarded, at least in part, to the application 110. Thus, in one example, the network adapter 150 may determine whether a received packet (e.g., a TCP/IP packet) should be processed by the offload stack 180 even before a connection (e.g., a TCP connection) is established.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system for managing a multiple stack environment, comprising:
   a computer;
   a first protocol processing stack assigned with a first port number;
   a second protocol processing stack assigned with a second port number; and
   a mapper coupled to the first protocol processing stack and to the second protocol processing stack;
   wherein the mapper stores a correspondence between the first port number and the second port number,
   wherein the first protocol processing stack, the second protocol processing stack and the mapper are part of the computer,
   wherein the mapper asks the first protocol processing stack for an available port number, and
   wherein the mapper sets the second port number equal to the available port number, and
   wherein the mapper queries a remote port mapper for a port number if the port number is not found in a local remote port mapping cache and invalidates entries in the local remote port mapping cache when reference counts to the entries are zero.

2. The system according to claim 1,
   wherein an application requests to listen on the first port number,
   wherein the first protocol processing stack listens for the application on the first port number, and
   wherein the second protocol processing stack listens for the application on the second port number.

3. The system according to claim 1, wherein the first protocol processing stack is unaware of the second protocol processing stack.

4. The system according to claim 1, wherein the application is unaware of a multi-stack environment.

5. The system according to claim 1, wherein the second port number is generated by the first protocol processing stack.

6. The system according to claim 1, wherein the first protocol processing stack comprises a host stack.

7. The system according to claim 1, wherein the first protocol processing stack comprises a Microsoft protocol processing stack.

8. The system according to claim 1, wherein the second protocol processing stack comprises an offload stack.

9. The system according to claim 1, wherein the second protocol processing stack comprises a system area network (SAN) provider stack.

10. The system according to claim 1, wherein the second protocol processing stack comprises remote direct memory access (RDMA) stack.

11. The system according to claim 1, further comprising:
    a network adapter coupled to the first protocol processing stack and to the second protocol processing stack.

12. The system according to claim 11, wherein the network adapter is adapted to store at least one of the second port number and information relating to the second port number being associated with the second protocol processing stack.

13. The system according to claim 11, wherein the network adapter comprises a data structure, the data structure being adapted to store at least one of the second port number and the association between the second port number and the second protocol processing stack.

14. The system according to claim 13, wherein the data structure comprises a lookup table.

15. A communication system, comprising:
a first computer comprising a first processing stack and a second processing stack, the first computer assigning a first port number to the first processing stack and a second port number to the second processing stack and storing a correspondence between the first port number and the second port number; and
a second computer coupled to the first computer via a network, the second computer requesting information about the second port number via at least one of the first port number and the stored correspondence between the first port number and the second port number,
wherein the first computer comprises a first port mapper, the first port mapper being coupled to the first processing stack and to the second processing stack, and
wherein the first port mapper asks the first processing stack for an available port number and assigns the available port number as the second port number to the second processing stack and stores a correspondence between the first port number and the second port number, and
wherein the first port mapper queries a remote port mapper for a port number if the port number is not found in a local remote port mapping cache and invalidates entries in the local remote port mapping cache when reference counts to the entries are zero.

16. The communication system according to claim 15,
wherein the first processing stack comprises a host stack of the first computer, and
wherein the second processing stack comprises an offload stack of the first computer.

17. The communication system according to claim 15, wherein a connection is established between the second computer and the first computer occurs using the second port number.

18. The communication system according to claim 15, wherein a connection between the second computer and the first computer occurs via an offload stack of the first computer.

19. The communication system according to claim 15, wherein communication between the second computer and the first computer occurs via the offload stack of the first computer before a connection is established.

20. The communication system according to claim 19, wherein the connection comprises a TCP connection.

21. The communication system according to claim 15, wherein the first port mapper comprises a first local port mapping database and a first remote port mapping cache.

22. The communication system according to claim 15, wherein the second computer comprises a second port mapper.

23. The communication system according to claim 22, wherein the second port mapper comprises a second local port mapping database and a second remote port mapping cache.

24. The communication system according to claim 22, wherein the second port mapper looks up information in the first port mapper.

25. The communication system according to claim 24, wherein the second port mapper looks up information in the first port mapper via an IP address of the first computer and the first port number of the first computer.

26. The communication system according to claim 24, wherein the second port mapper attempts to look up information in a second remote port mapping cache of the second port mapper and, if the information does not reside in the second remote port mapping cache, then the second port mapper looks up the information in the first port mapper.

27. The communication system according to claim 22, wherein the second port mapper looks up the information in the first port mapper via an IP address of the first computer and the first port number of the first computer.

28. The communication system according to claim 22,
wherein the second port mapper comprises a second remote port mapping cache, and
wherein one or more entries in the second remote port mapping cache are updated by requesting information from the first port mapper.

29. The communication system according to claim 28, wherein the one or more entries in the second remote port mapping cache are updated periodically.

30. The communication system according to claim 22,
wherein the second port mapper comprises a second remote port mapping cache, and
wherein one or more entries in the second remote port mapping cache are invalidated.

31. The communication system according to claim 28, wherein the one or more entries in the second remote port mapping cache are invalidated when no connections are using the one or more entries.

32. A method for managing multiple stack environment, comprising:
listening on a first port number by an application running on a computer;
associating the first port number to a first processing stack of the computer;
associating a second port number to the second processing stack of the computer;
sending a packet received by the computer to the application via the second processing stack, the received packet comprising the second port number;
inquiring of the first processing stack by a port mapper of the computer as to an available port number;
setting, by the port mapper, the second port number equal to the available port number; and
storing at least one of the second port number and a correspondence between the first port number and the second port number in the port mapper,
wherein the port mapper queries a remote port mapper for a port number if the port number is not found in a local remote port mapping cache and invalidates entries in the local remote port mapping cache when reference counts to the entries are zero.

33. The method according to claim 32, wherein the sending occurs before a connection has been established.

34. The method according to claim 32, wherein the received packet comprises a TCP SYN message.

* * * * *

UNITED STATES PATENT AND TRADEMARK OFFICE
CERTIFICATE OF CORRECTION

PATENT NO.       : 7,647,414 B2                                            Page 1 of 1
APPLICATION NO. : 10/336983
DATED            : January 12, 2010
INVENTOR(S)      : Kan Frankie Fan It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1955 days.

Signed and Sealed this

Twenty-eighth Day of December, 2010

David J. Kappos
*Director of the United States Patent and Trademark Office*